(No Model.)  2 Sheets—Sheet 1.

A. BORROR, Jr.

SCALE PEN FOR WEIGHING CATTLE.

No. 283,371.  Patented Aug. 21, 1883.

Witnesses:
T. C. Brecht
A. H. Byers

Inventor:
Absalom Borror Jr
Per A. H. Byers
Attorney (No Model.) 2 Sheets—Sheet 2.
A. BORROR, Jr.
SCALE PEN FOR WEIGHING CATTLE.

No. 283,371. Patented Aug. 21, 1883.

Witnesses:
Inventor:
Absalom Borror Jr.
Per A. H. Byus
Attorney.

UNITED STATES PATENT OFFICE.

ABSALOM BORROR, JR., OF SHADEVILLE, OHIO.

SCALE-PEN FOR WEIGHING CATTLE.

SPECIFICATION forming part of Letters Patent No. 283,371, dated August 21, 1883.

Application filed May 7, 1883. (No model.)

*To all whom it may concern:*

Be it known that I, ABSALOM BORROR, Jr., a citizen of the United States, residing at Shadeville, in the county of Franklin and State of Ohio, have invented a new and useful Scale Rack or Pen, of which the following is a specification.

My invention relates to improvements in platform scale racks or pens in which the sides are adjustable, so as to admit the weighing of cattle and hay without removing the cattle-pen or adjusting the scales. I attain these objects by the mechanism illustrated in the accompanying drawings, in which—

Figure 1:
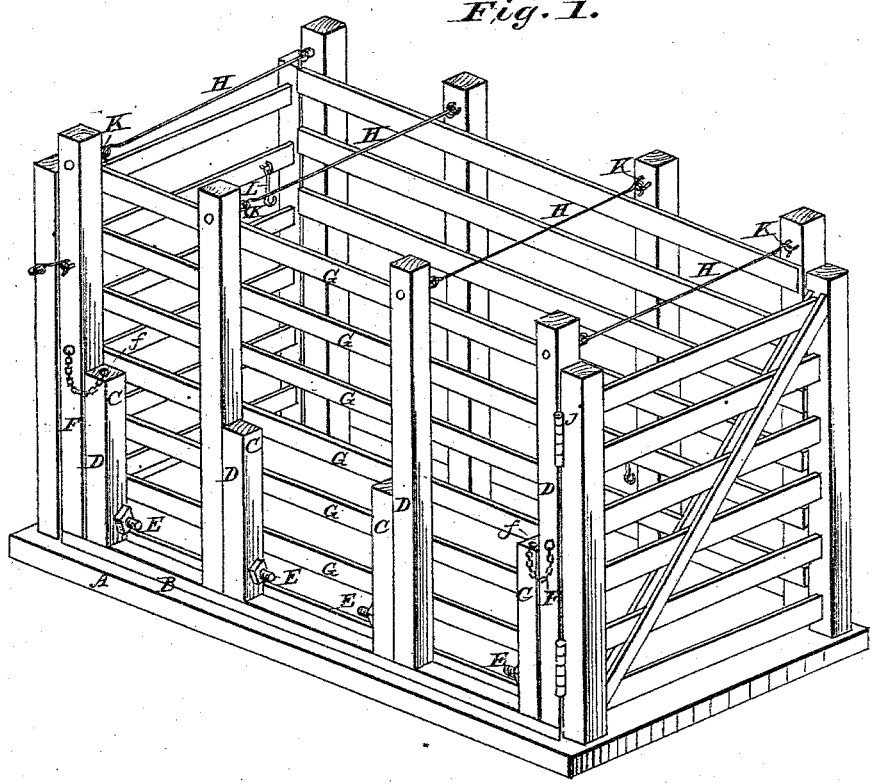
Figure 2:
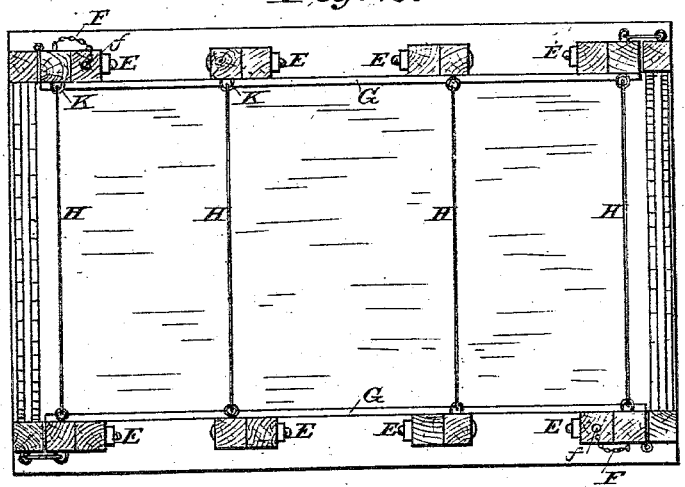
Figure 3:
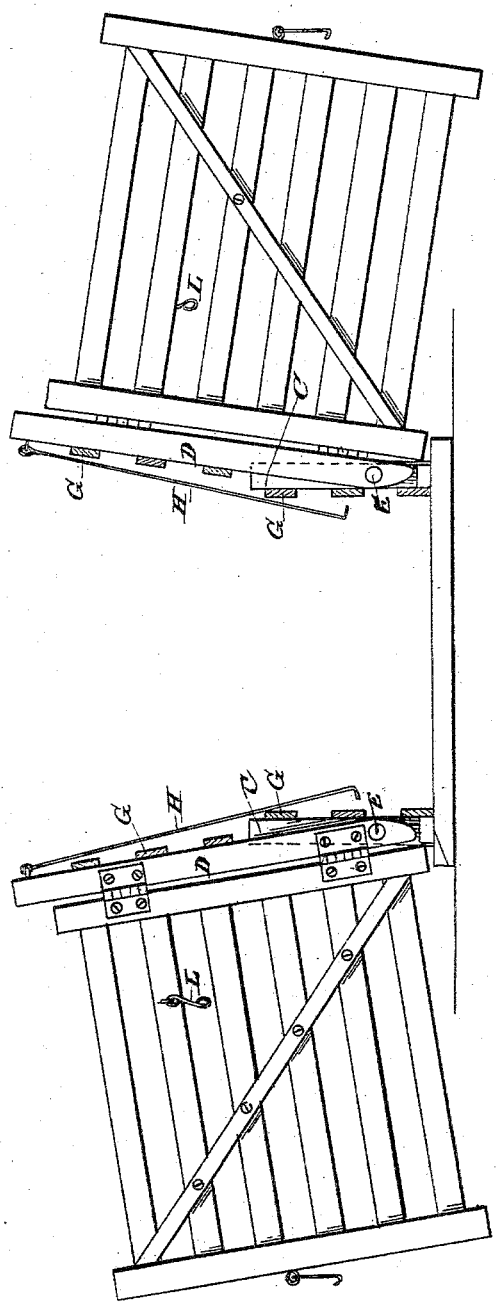

Figure 1 is a detailed view in perspective. Fig. 2 is a top view of the platform and pen when closed for weighing cattle. Fig. 3 is an end view, showing the pen open for weighing hay.

Similar letters refer to similar parts throughout the several views.

The floor of the pen A is the platform for the scales, and the timbers B B are secured to the platform, as shown in Fig. 1, for the purpose of strengthening it and supporting the upright posts $c\ c\ c\ c$. These posts, with the boards G G, form the ordinary inclosure for scales. To these posts are pivoted, by means of bolts E E E E, other posts, D D D D, of the same size and of sufficient height to form a complete guard, securing cattle or other stock while being weighed. By means of this device the sides of the pen can be swung outward, widening the space between them, to receive a load of hay without coming in contact with it. The sides of the pen may be held at any desired inclination by chains F F, one end of each of which is secured to post $c$ at $f$, and any link of which can be slipped over a pin in posts D D. By this means the sides of the pen can be inclined to any desired position. Ordinary fencing boards, nailed to the posts, form the inclosure for weighing any stock. When weighing cattle or stock of any kind the sides are held in an upright position by the rods H H H H, which hook into staples K K, as shown in Fig. 2. The ends of the pen are closed by ordinary gates.

To hold the gates open when weighing hay, I attach links L L to the gates in such a position that one of the rods H will hook into it when the gate is swung in line with the side of the pen, thus holding it in position without fastening it to a post or other substance not connected with the scales, which would interfere with correct weighing. When the gates are closed, as for weighing cattle, the rods H H H H hold the sides of the pen in perpendicular position, as shown in Fig. 2.

I am aware that prior to my invention cattle-pens have been made with swinging sides. I therefore do not claim such a combination broadly; but What I do claim as my invention, and desire to secure by Letters Patent, is—

The combination, in a cattle-pen, of the sides D D D D, pivoted to the posts $c\ c\ c\ c$, provided with chains F F, rods H H H H, and links L L, substantially as set forth.

ABSALOM BORROR, JR.

Witnesses:
A. H. BYERS,
C. E. BYERS.